(12) United States Patent
Gonen

(10) Patent No.: US 10,112,851 B2
(45) Date of Patent: Oct. 30, 2018

(54) PERCHLORATE REMOVAL FROM AQUEOUS INDUSTRIAL LIQUIDS

(71) Applicant: TOXSORB LTD., Giladi (IL)

(72) Inventor: Yotam Gonen, Gailadi (IL)

(73) Assignee: Toxsorb Ltd. (IL)

( * ) Notice: Subject to any disclaimer, the term of this patent is extended or adjusted under 35 U.S.C. 154(b) by 292 days.

(21) Appl. No.: 14/768,674

(22) PCT Filed: Feb. 18, 2014

(86) PCT No.: PCT/IL2014/050179
§ 371 (c)(1),
(2) Date: Aug. 18, 2015

(87) PCT Pub. No.: WO2014/128702
PCT Pub. Date: Aug. 28, 2014

(65) Prior Publication Data
US 2016/0002077 A1    Jan. 7, 2016

Related U.S. Application Data

(60) Provisional application No. 61/767,277, filed on Feb. 21, 2013.

(51) Int. Cl.
| | | |
|---|---|---|
| C02F 1/52 | (2006.01) | |
| B01D 21/01 | (2006.01) | |
| C02F 1/38 | (2006.01) | |
| B01D 37/00 | (2006.01) | |
| C02F 1/54 | (2006.01) | |
| C02F 1/00 | (2006.01) | |
| B03D 3/00 | (2006.01) | |
| C02F 1/76 | (2006.01) | |
| B01D 21/26 | (2006.01) | |
| C07C 211/00 | (2006.01) | |
| C07C 215/00 | (2006.01) | |
| C02F 1/68 | (2006.01) | |
| C02F 1/58 | (2006.01) | |
| C02F 1/70 | (2006.01) | |
| C02F 101/12 | (2006.01) | |
| C02F 103/00 | (2006.01) | |
| C02F 103/06 | (2006.01) | |
| C02F 103/32 | (2006.01) | |

(52) U.S. Cl.
CPC ............. *C02F 1/5272* (2013.01); *C02F 1/52* (2013.01); *C02F 1/54* (2013.01); *C02F 1/58* (2013.01); *C02F 1/68* (2013.01); *C02F 1/683* (2013.01); *C02F 1/705* (2013.01); *C02F 2101/12* (2013.01); *C02F 2103/007* (2013.01); *C02F 2103/06* (2013.01); *C02F 2103/32* (2013.01)

(58) Field of Classification Search
None
See application file for complete search history.

(56) References Cited

U.S. PATENT DOCUMENTS

| | | | | |
|---|---|---|---|---|
| 5,504,113 | A * | 4/1996 | Lucero | ................. A61K 9/0048 |
| | | | | 514/554 |
| 6,066,257 | A * | 5/2000 | Venkatesh | ................. C02F 1/42 |
| | | | | 210/615 |
| 2010/0176061 | A1 | 7/2010 | Monzyk et al. | |

FOREIGN PATENT DOCUMENTS

| WO | 2009/053972 A1 | 4/2009 | |
|---|---|---|---|
| WO | WO-2009053972 A2 * | 4/2009 | ............. A61K 31/57 |

OTHER PUBLICATIONS

Sigma (Benzalkonium chloride, pp. 1-3, accessed online Sep. 18, 2017).*
United Utilities (The pH of drinking water, pp. 1-2, accessed online Sep. 18, 2017).*
International Search Report for corresponding application No. PCT/IL2014/050179.
Urbanski and Schock, Preprints of Extended Abstracts, vol. 39(2), pp. 63-65, Symposia Papers presented before the Division of Environmental Chemistry, New Orleans 1999.
Srinivasan and Sorial, Separ Purific Technol 2009, vol. 69, pp. 7-21.
Gu et al., Environ Sci Technol 2007, vol. 41(17), pp. 6277-6282.
Logan et al., Wat. Res. 2001, vol. 35(12), pp. 3034-3038.
Thrash et al., Appl Microbial Biotechnol 2010, vol. 86, pp. 335-343.

* cited by examiner

*Primary Examiner* — Clare M Perrin
(74) *Attorney, Agent, or Firm* — Wood, Phillips, Katz, Clark & Mortimer

(57) ABSTRACT

The invention provides processes for purification of aqueous industrial liquids from perchlorate ions by reducing perchlorate ion concentration or by precipitating a water-insoluble perchlorate salts.

18 Claims, No Drawings

PERCHLORATE REMOVAL FROM AQUEOUS INDUSTRIAL LIQUIDS

TECHNOLOGICAL FIELD

The present invention relates to processes of treating aqueous industrial liquids for removal of perchlorate ions therefrom.

REFERENCES

Acknowledgement of the above references herein is not to be inferred as meaning that these are in any way relevant to the patentability of the presently disclosed subject matter.
[1] Urbanski and Schock, *Preprints of Extended Abstracts*, vol. 39(2), pp. 63-65, Symposia Papers presented before the Division of Environmental Chemistry, New Orleans 1999
[2] Srinivasan and Sorial, *Separ Purific Technol* 2009, vol. 69, pp. 7-21
[3] WO 2009/053972
[4] Gu et al., *Environ Sci Technol* 2007, vol. 41(17), pp. 6277-6282
[5] Logan et al., *Wat. Res.* 2001, vol. 35(12), pp. 3034-3038
[6] Thrash et al., *Appl Microbiol Biotechnol* 2010, vol. 86, pp. 335-343

BACKGROUND

Perchlorate is one of the contaminants increasingly found in wastewater, groundwater, surface water and soil. Perchlorate is known for its adverse effects to human health by interfering with iodide uptake into the thyroid gland [1-2]. It is highly soluble in water and organic solvents, and is difficult to complex with common cations, organic or inorganic. Although several complexants of perchlorate were suggested for gravimetric analysis purposes, such as methylene blue, nitron, tetraphenyl-arsonium and cetyltrimethylammonium, no complexant has been identified as suitable for large-scale water treatment, mainly due to high toxicity and relatively high solubility, as well as the requirement for drastic pH manipulation in order to facilitate precipitation. The common treatment processes of water include absorption and/or ion exchange by active groups located on the surface of an adsorbing substrate [3-4]. However, the efficiency of these processes is limited, typically when perchlorate concentration are >10 ppm, as saturation of the active absorption sites is rapidly achieved, thereby preventing further perchlorate adsorption. In addition, the regeneration process of such substrates results in the formation of perchlorate-rich brines, which need to be further processed, rendering the process costly and environmentally problematic. Other processes include bacterial decomposition of perchlorate. Such processes are relatively slow and require constant monitoring and maintenance of strict conditions throughout the process [5-6].

Therefore, there is a need for an efficient and rapid process for the removal of perchlorate from relatively highly concentrated aqueous solutions of perchlorate.

GENERAL DESCRIPTION

The present invention aims at providing a process for efficient removal of perchlorate ions from aqueous liquids by precipitation. The process of the invention enables treatment of liquids containing high concentrations of perchlorates without the formation of problematic highly-concentrated perchlorate brines.

Therefore, in one of its aspects, the invention provides a process for reducing perchlorate ions ($ClO_4^-$) concentration in an aqueous industrial liquid, the process comprising mixing the aqueous industrial liquid with at least one compound of formula (I):

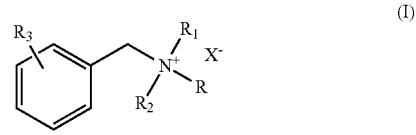

wherein
R is a —$(C_3-C_{18})$alkyl;
$R_1$ and $R_2$ are each independently selected from H, and a —$(C_1-C_6)$alkyl;
$R_3$ is one or more (i.e. between one and five) substituents, each independently selected from H, —$(C_1-C_6)$alkyl, —$(C_1-C_6)$alkoxy, —NHCO$(C_1-C_6)$alkyl, —OH, and —NH$_2$;
and X is a balancing anion, for example, a halide, a pseudohalide, nitrate or hydroxide; thereby obtaining a perchlorate salt which is insoluble in said aqueous industrial liquid.

The term "reducing", or any lingual variation thereof refers to decreasing perchlorate concentration in the aqueous industrial liquid. In some embodiments, the reduction may be by at least 50% mol as compared to the starting concentration of perchlorate in the industrial liquid. In other embodiments, the reduction may be by at least 50% mol, at least 60% mol, at least 70% mol, at least 75% mol, at least 80% mol, at least 85% mol, at least 90% mol, at least 95% mol, at least 97% mol or even at least 98% mol as compared to the starting concentration of perchlorate in the industrial liquid.

The term "precipitating", or any lingual variation thereof, refers to the formation of solid perchlorate salts which sediment (i.e. precipitate) out of the aqueous industrial liquid. By the process of precipitation, the removal of perchlorate ions from the industrial aqueous liquid is obtained.

The term "removal" is meant to encompass a decrease in the concentration of perchlorate ions in the treated industrial liquid. In some embodiments, the term relates to a decrease of at least 50% mol in the concentration of perchlorate ions. In other embodiments, the decrease is at least 60% mol, at least 70% mol, at least 80% mol, at least 85% mol, at least 90% mol, or at least 95% mol in the concentration of perchlorate ions. At times the term means substantially complete removal of perchlorate ions from the industrial liquid, e.g. at least 98% mol, at least 99% mol decrease in perchlorate ion concentration.

The process of the invention enables the removal of perchlorate from "industrial liquid(s)". As used herein, the term refers to any liquid containing perchlorate ions. In some embodiments, the industrial liquid is an aqueous industrial liquid. The industrial liquid may relate to groundwater, surface water, municipal wastewater, industrial wastewater, agricultural wastewater, and brine waste from ion exchange processes.

In the process of the invention, the industrial liquid is mixed with a compound of formula (I). As used herein, alkyl carbon chains, if not otherwise specified, contain from 1 to 18 carbons, or 1 or 2 or 3 to 18 carbons, and are straight or branched. The term "$C_1$-$C_6$ alkyl" should be understood to encompass any straight or branched alkyl moiety having 1, 2, 3, 4, 5 or 6 carbon atoms. Exemplary alkyl groups include, but are not limited to, methyl, ethyl, propyl, isopropyl, isobutyl, n-butyl, sec-butyl, tert-butyl, and isohexyl.

As used herein, "alkoxy" refers to R'O—, in which R' is a ($C_1$-$C_6$)alkyl.

In reference to group $R_3$, substitutent on an aryl moiety, it is said that each represents "one or more substituent", namely one or two or three or four or five substitutions on the ring. When the ring bears one $R_3$ group, this single group may be a substituent positioned on any one of the ring positions, i.e., ortho, meta, or para. When the ring is substituted by two $R_3$ substituting groups, the two groups may be on neighboring carbon atoms (ortho to each other), or may be separated by one or more ring carbon atoms. When the ring is substituted by three or more substituting groups, the groups may be substituted on any one of the ring positions at any variation available.

As used herein, "halide", "halogen" or "halo" refers to F, Cl, Br or I. The term "pseudohalides" or pseudohalo groups refers to groups that behave substantially similarly to halides. Such compounds can be used in the same manner and treated in the same manner as halides. Pseudohalides include, but are not limited to, cyanide, cyanate, thiocyanate, selenocyanate, trifluoromethoxy, and azide.

In some embodiments, $R_1$ and $R_2$ are each independently selected from H and a methyl.

In other embodiments, $R_3$ is one or more substituent, each independently selected from H, methyl, ethyl and propoyl.

In additional embodiments, $R_1$ and $R_2$ are both H, and $R_3$ is a methyl.

In some other embodiments, $R_1$, $R_2$ and $R_3$ are H.

According to some embodiments, R is a —($C_6$-$C_{18}$)alkyl. In such embodiments, R may be a —($C_{12}$-$C_{18}$)alkyl.

In additional embodiments, the compound of formula (I) is benzalkonium chloride, wherein R is —($C_3$-$C_{18}$)alkyl. In some additional embodiments, the compound of formula (I) is a benzalkonium salt, in which R is —($C_3$-$C_{18}$)alkyl.

In further embodiments, the compound of formula (I) is a benzalkonium salt, in which R is —($C_{12}$-$C_{18}$)alkyl. In such embodiments, the balancing anion may be a halide (e.g. $Cl^-$), a pseudohalide, nitrate or hydroxide.

The process of the invention results in the formation of a perchlorate salt, which is insoluble in said aqueous industrial liquid. The term "insoluble" refers to limited solubility of the perchlorate salt, namely solubility of at most $5 \times 10^{-4}$ M, or a solubility product (i.e. Ksp) of at most $2.5 \times 10^{-8}$ $M^2$, in water at ambient temperature (10-45° C.).

The process of the invention may be carried out at a controlled pH level. In some embodiments, the mixing is carried out at a pH range of between about 4 and 14. In some other embodiments, the pH range is between about 5 and 10. In yet other embodiments, the pH range is between 6 and 9.

In order to maintain the required pH value, in some embodiments the process may further comprise adjusting the pH of the industrial liquid to a pH of between about 4 and 14. pH adjustment may be obtained and/or maintained by the addition of any strong base such as, sodium hydroxide, potassium hydroxide or calcium hydroxide or by adding ion exchangers having basic pH (i.e. pH>7) to the industrial liquid prior to or during mixing with a compound of formula (I).

As used herein, the term "about" is meant to encompass deviation of ±10% from the specifically mentioned value of a parameter, such as temperature, pressure, concentration, etc.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween. It should be noted that where various embodiments are described by using a given range, the range is given as such merely for convenience and brevity and should not be construed as an inflexible limitation on the scope of the invention. Accordingly, the description of a range should be considered to have specifically disclosed all the possible sub-ranges as well as individual numerical values within that range.

In some embodiments, the compound of formula (I) is mixed with said aqueous industrial liquid in a molar excess relative to the perchlorate ion molar concentration. Therefore, the molar ratio of perchlorate ion to the compound of formula (I) may range between about 1:1.05 and 1:3 namely the molar ratio may be between 1:1.05 and 1:2.5, between 1:1.05 and 1:2, between 1:1.05 and 1:1.5, or even between 1:1.05 and 1:2.5. Alternatively, the ratio may be between 1:1.1 and 1:3, between 1:1.25 and 1:3, between 1:1.5 and 1:3, or 1:1.75 and 1:3.

In some embodiments, the molar ratio of between compound of formula (I) and perchlorate ion in said aqueous industrial liquid is at least 1:1. In other embodiments, the ratio is said to be "equimolar", namely a ratio of about 1:1.

The process of the invention may be employed on industrial liquids having a range of concentrations of perchlorate ions. In some embodiments, the perchlorate ion has a concentration of at least 20 ppm in said aqueous industrial liquid. In other embodiments, said perchlorate ion concentration may be of at least 20 ppm in the aqueous industrial liquid.

In order to facilitate tailoring of the required amount of compound of formula (I) to be mixed with the industrial liquid, the process of the invention may further comprise determining the perchlorate ion concentration in the aqueous industrial liquid prior to mixing with a compound of formula (I). Additionally, or alternatively, the process may comprise determining the perchlorate ion concentration in the aqueous industrial liquid after mixing with a compound of formula (I) in order to establish the efficiency of perchlorate removal. The perchlorate concentration determination, which may also by carried out in-situ during the mixing, may be carried out by any suitable technique known in the art, such as (but not limited to), ion specific electrode, titration, potentiometric titration, gravimetric analysis, chromatography, etc.

The mixing of the industrial liquid with the compound of formula (I) may be carried out by a variety of mixing techniques known in the art. Such techniques may include, but are not limited to, static mixing, cross-counter flow, pneumatic and/or electrically operated mixing stirrer/paddle, magnetic stirring, etc.

In some embodiments, the mixing is carried out in two stages: (i) rapid mixing, and (ii) slow mixing. The term "rapid mixing" refers to typical mixing speed of 10-50 RPM (rotations per minute). The term "slow mixing" refers to mixing speed of 2-5 RPM.

Without wishing to be bound by theory, during the initial stages of rapid mixing perchlorate ions are brought into intimate contact with the compound of formula (I), causing immediate flocculation. The term "flocculate", or any lingual derivative therefore, refers to a process wherein colloids are exerted out of a suspension in the form of floc or flakes. After initial flocculation has occurred, the slow mixing allows for growth of the flocs to a critical mass, allowing the flocs to precipitate out of the suspension. The water-insoluble perchlorate salt may precipitate in any solid form, namely amorphous or crystalline.

According to some embodiments, the rapid mixing is carried out for a period of time of at most 5 minutes. In such embodiments, the rapid mixing may be carried out for a period of time of between about 10 seconds and 5 minutes, namely 10 seconds, 20 seconds, 30 seconds, 40 seconds, 50 seconds, 1 minute, 2 minutes, 3 minutes, 4 minutes or 5 minutes.

According to other embodiments, the slow mixing is carried out for a period of time of at least 3 minutes. In such embodiments, the slow mixing is carried out for a period of time between about 3 minutes and 30 minutes. In such embodiments, the slow mixing may be carried out for a period of time between about 5 minutes and 15 minutes (namely, 5, 6, 7, 8, 9, 10, 11, 12, 13, 14, or 15 minutes).

As the process of the invention yields an insoluble perchlorate salt, in some embodiments the process further comprises separating said insoluble salt from said aqueous industrial liquid. The separation may be carried out by any suitable process, inter alia, selected from decantation, filtering, centrifugation and cyclonic separation.

In another aspect, the invention provides a process for precipitating a water-insoluble perchlorate salt from an aqueous solution, the process comprising:
providing an aqueous solution comprising at least 20 ppm perchlorate ions;
providing a water-soluble compound of formula (I):

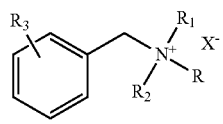
(I)

wherein
R is a —$(C_3-C_{18})$alkyl;
$R_1$ and $R_2$ are each independently selected from H and —$(C_1-C_6)$alkyl;
$R_3$ is one or more substituent, each independently selected from H, —$(C_1-C_6)$alkyl, —$(C_1-C_6)$alkoxy, —NHCO$(C_1-C_6)$alkyl, —OH, and —$NH_2$;
and X is a balancing anion;
mixing said water-soluble compound of formula (I) into said aqueous solution, the molar ratio of said water-soluble compound of formula (I) and said perchlorate ion being at least 1:1; and
allowing said water-insoluble perchlorate salt to flocculate and precipitate out of the solution.

It should be noted, that the term "solution" should be given its broadest definition to encompass a liquid state in which one component is dissolved in another or in a liquid medium.

For economic reasons, it is sometimes desired to reconstitute the compound of formula (I) from the water-insoluble perchlorate salt, to thereby facilitate its re-use. Therefore, in an additional aspect, the invention provides a process of obtaining a compound of formula (I),

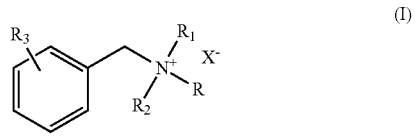
(I)

wherein
R is a —$(C_3-C_{18})$alkyl;
$R_1$ and $R_2$ are each independently selected from H and —$(C_1-C_6)$alkyl;
$R_3$ is one or more substituent, each independently selected from H, —$(C_1-C_6)$alkyl, —$(C_1-C_6)$alkoxy, —NHCO$(C_1-C_6)$alkyl, —OH, and —$NH_2$;
and X is $Cl^-$;
the process comprising:
providing of an aqueous slurry of an insoluble perchlorate salt by a process described hereinabove; and
contacting said insoluble perchlorate salt with a reduction agent under conditions permitting the reduction of the perchlorate in the insoluble perchlorate salt into a compound of formula (I) and a chloride balancing anion.

The term "aqueous slurry" refers to a liquid mixture of particles of the insoluble perchlorate salt and an aqueous medium.

In some embodiments, the reduction agent is zerovalent iron.

In other embodiments, said conditions are selected from acidic pH, elevated temperature and combinations thereof.

According to some embodiments, said acidic pH is in a range of between 0 and 6, i.e. the pH may be 0, 1, 2, 3, 4, 5 or 6. In some embodiments, said acidic pH may be between 1 and 2. The acidic pH may be obtained by adding an acid, typically an inorganic acid such as a halo-acid, to the slurry.

According to other embodiments, said elevated temperature is in a range of between about 80 and 200° C. In such embodiments, the elevated temperature may be between about 80 and 150° C., between about 80 and 120° C., or between about 80 and 100° C. In other such embodiments, the elevated temperature may be between about 100 and 200° C., between about 120 and 200° C., between about 150 and 200° C., or even between about 170 and 200° C.

According to some other embodiments, the molar ratio between said zerovalent iron to said water-insoluble perchlorate salt is between 4:1 and 40:1. According to such embodiments, this ratio may be between 4:1 and 30:1, between 4:1 and 20:1, between 4:1 and 10:1, between 10:1 and 40:1, or between 20:1 and 40:1, or between 30:1 and 40:1.

As noted hereinabove, in order to obtain a compound of formula (I), the insoluble perchlorate salt is contacted with zerovalent iron (i.e. $Fe^0$). As used herein, the term "contacting", or any lingual variation thereof, refers to the bringing together of the material to be transformed (i.e., the insoluble perchlorate salt carried or contained in an aqueous medium) and the zerovalent iron in such a way to allow intimate contact between them. The contacting may be, for example, by cross-flow of liquids, by mixing and/or dissolving the materials in an aqueous medium, flowing the aqueous medium over a solid substrate of iron (which may or may not be porous), etc. The contacting may be carried out for a period of time required to transform the insoluble perchlorate salt into a compound of formula (I). Said period of time may be between about 2 and 12 hours, typically between 2 and 6 hours.

The processes of the invention may be carried out by using a reaction vessel, a reaction chamber or a reactor, which may be of any size or shape, and constructed of any material suitable to withstand acidic and/or basic pH conditions, heat and pressure. Non-limiting examples are a pipe reactor, tank reactor, fixed bed reactor, a moving bed reactor, a fluidized bed reactor and a circulating fluidized bed reactor.

The liquids used in the processes of the invention may be fed into the reaction vessel via a liquid feeding unit, capable of transferring said liquid to said reaction vessel. The feeding unit is typically connected to the reaction vessel through appropriate tubing system. Said unit may have metering means for measuring exact amount of liquids transferred to the reaction vessel.

The reactor may further comprise a temperature control unit, such as a heating/cooling unit or a heat exchanger, along with means for controlling said unit in response to autothermic or the absence of autothermic conditions within the reaction chamber; internal temperature gauges for monitoring the reaction's temperature; condensation units, scrubbing units and absorption columns, to afford treatment of gaseous reaction products and gaseous contaminants; baffles of various geometries for controlling the flow profile of substance within the reactor; a top plate that is movable with respect to an outer body of the reactor; a base plate that is movable with respect to an outer body of the reactor; reactants inlets at various angles; and products outlets at various angles.

As will be further disclosed herein, the processes of the present invention involve numerous process steps which may or may not be associated with other common physical-chemical processes so as to achieve the desired purity and form of each of the isolated components.

As used herein, the singular form "a", "an" and "the" include plural references unless the context clearly dictates otherwise. For example, the term "a compound of formula (I)" may independently include a plurality of compounds of formula (I), including mixtures thereof.

Throughout this specification and the claims which follow, unless the context requires otherwise, the word "comprise", and variations such as "comprises" and "comprising", will be understood to imply the inclusion of a stated integer or step or group of integers or steps but not the exclusion of any integer or step or group of integers and steps.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

DETAILED DESCRIPTION OF EMBODIMENTS

In order to better understand the subject matter that is disclosed herein and to exemplify how it may be carried out in practice, embodiments will now be described, by way of non-limiting example only.

Example 1

Three tubes containing water solution with 200 ppm perchlorate were treated with 1.8, 2 and 2.2 mM of benzalkonium chloride (corresponding to benzalkonium: perchlorate ratio of 0.9:1, 1:1, and 1.1:1, respectively). White-milky turbidity appeared immediately after benzalkonium chloride addition, and after 1 minute of gentle agitation, the milky turbidity transformed to clear solution with white flakes (2-5 mm diameter). The tubes were agitated on an orbital shaker for 2 h, and then centrifuged. Supernatant was analyzed for benzalkonium and perchlorate concentrations. Results are presented in Table 1.

TABLE 1 perchlorate precipitation experiments

| | Sample prior to precipitation | | Sample after precipitation | |
|---|---|---|---|---|
| Sample | Perchlorate (ppm) | Benzalkonium chloride (mM) | Benzalkonium chloride (mM) | Perchlorate (ppm) |
| 1 | 200 | 1.8 | 0.114 | 36.15 |
| 2 | 200 | 2 | 0.239 | 21.64 |
| 3 | 200 | 2.2 | 0.349 | 17.6 |

Calculating the molar ratio of the benzalkonium/perchlorate in the precipitate (calculated by the solution depletion) yielded 1.03, 0.987, and 1.01 for tubes 1, 2 and 3, respectively; indicating a 1:1 complex between benzalkonium and perchlorate was formed.

Example 2

0.5 mM benzalkonium chloride was introduced into 20 ppm perchlorate solution (a molar ration benzalkonium/perchlorate of 2.5) in drinking water matrix and in 0.5 N NaOH solutions. Reference tubes with no perchlorate were prepared in the same manner.

In the tubes containing perchlorate, white-milky turbidity appeared immediately after benzalkonium chloride addition, and after 1 minute of gentle agitation, the milky turbidity transformed to clear solution with white flakes (2-5 mm diameter). No turbidity or flocculation was observed in the reference tubes that did not contain perchlorate. The tubes were agitated on an orbital shaker for 1 h, and then centrifuged. Supernatant was analyzed for benzalkonium and perchlorate concentrations.

Results are presented in Table 2.

TABLE 2 perchlorate precipitation experiments

| | Sample prior to precipitation | | | Perchlorate conc. after precipitation (ppm) |
|---|---|---|---|---|
| Sample | Perchlorate (ppm) | Benzalkonium chloride (mM) | NaOH (M) | |
| 1 | 0 | 0.5 | 0 | 0.0012 |
| 2 | 20 | 0.5 | 0 | 14.5526 |
| 3 | 0 | 0.5 | 0.5 | 0.019 |
| 4 | 20 | 0.5 | 0.5 | 5.1506 |

As can be observed in Table 2, an excess of benzalkonium ion precipitates perchlorate to affording lower concentrations of perchlorate after completion of precipitation, compared to 1:1 molar ratio in Example 1. It is evident that in the addition of NaOH to the reaction vessel increases the precipitation effectiveness.

Example 3

The feasibility of chemical reduction of the benzalkonium-perchlorate precipitate for reusing the benzalkonium ions was estimated as follows: 3 ml of 5 g/l perchlorate solution, 0.9 ml of 140 mM benzalkonium and 1.5 ml DW solution were agitated for 30 min, resulting in benzalkonium-perchlorate precipitate. After agitation, 0.6 ml sulfuric acid 2.5 M and a 0.1 g of zerovalent iron powder were introduced into the tube, and the tube was sealed and placed in a heating block for 5 h in 120° C. After the tube was allowed to cool, the solution was analyzed for benzalkonium and perchlorate concentrations.

Benzalkonium concentration was 18.6 mM (corresponds to 87% recovery), and perchlorate concentrations was 1.2 ppm (corresponding to 90.4% elimination). This result indicates that the perchlorate in the benzalkonium-perchlorate precipitate can be reduced with zerovalent iron in acidic solution in high temperature, affording recycling of the benzalkonium ion for further use.

The invention claimed is:

1. A process for precipitating a water-insoluble perchlorate salt from an aqueous solution, the process comprising:
mixing a water-soluble compound of formula (I) into an aqueous solution comprising at least 10 ppm perchlorate ions to obtain a mixed aqueous solution, the molar ratio of said water-soluble compound of formula (I) and said perchlorate ions being at least 1:1, the water-soluble compound of formula (I) being:

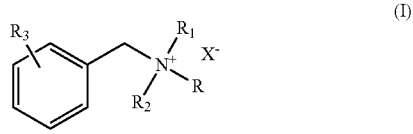

wherein
R is a —($C_3$-$C_{18}$)alkyl;
$R_1$ and $R_2$ are each independently selected from H and —($C_1$-$C_6$)alkyl;
$R_3$ is one or more substituent, each independently selected from H, —($C_1$-$C_6$)alkyl, —($C_1$-$C_6$)alkoxy, —NHCO($C_1$-$C_6$)alkyl, —OH, and —$NH_2$;
and X is a balancing anion selected from the group consisting of a halide, a nitrate and a hydroxide; and
allowing said water-insoluble perchlorate salt to flocculate and precipitate out of the mixed aqueous solution.

2. The process of claim 1, wherein $R_1$ and $R_2$ are each independently selected from H and methyl.

3. The process of claim 1, wherein $R_3$ is one or more substituent, each independently selected from H, methyl, ethyl, and propyl.

4. The process of claim 1, wherein $R_1$ and $R_2$ are both H, and $R_3$ is H or a methyl.

5. The process of claim 1, wherein R is a —($C_{12}$-$C_{18}$) alkyl.

6. The process of claim 1, wherein said mixing is carried at a pH range of between about 4 and 14, optionally wherein the process further comprises adjusting the pH of the aqueous solution to a pH of between about 4 and 14.

7. The process of claim 1, wherein said compound of formula (I) is mixed with said aqueous solution in a molar excess relative to the perchlorate ion molar concentration.

8. The process of claim 1, wherein said perchlorate ion is in a concentration of at least 20 ppm in said aqueous solution.

9. The process of claim 1, wherein said mixing is carried out in two stages: (i) mixing at about 2-5 rpm, and (ii) mixing at about 10-50 rpm.

10. The process of claim 9, wherein the mixing at about 2-5 rpm is carried out for a period of time of between about 10 seconds and 5 minutes.

11. The process of claim 9, wherein the mixing at about 10-50 rpm is carried out for a period of time of between about 3 minutes and 30 minutes.

12. The process of claim 1, further comprising separation of said water-insoluble perchlorate salt from said mixed aqueous solution, optionally by a process selected from decantation, filtering, centrifugation, and cyclonic separation.

13. The process of claim 1, wherein the aqueous solution is selected from groundwater, surface water, wastewater, agricultural wastewater, and ion exchange waste brine.

14. The process of claim 1, further comprising separating precipitated water-insoluble perchlorate salt from the mixed aqueous solution to obtain water-insoluble perchlorate salt and perchlorate-reduced aqueous solution.

15. The process of claim 14, wherein the concentration of perchlorate in the perchlorate-reduced aqueous solution is at least 50% less than the perchlorate concentration in the aqueous solution.

16. A process for precipitating a water-insoluble perchlorate salt from an aqueous solution, the process comprising:
mixing a water-soluble compound of formula (I) into an aqueous solution comprising perchlorate ions to obtained a mixed aqueous solution, the molar ratio of said water-soluble compound of formula (I) and said perchlorate ions being at least 1:1, the water-soluble compound of formula (I) being

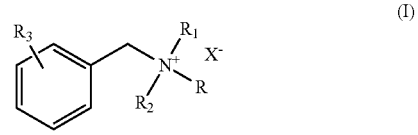

wherein
R is a —($C_3$-$C_{18}$)alkyl;
$R_1$ and $R_2$ are each independently selected from H and —($C_1$-$C_6$)alkyl;
$R_3$ is one or more substituent, each independently selected from H, —($C_1$-$C_6$)alkyl, —($C_1$-$C_6$)alkoxy, —NHCO($C_1$-$C_6$)alkyl, —OH, and —$NH_2$;
and X is a balancing anion selected from the group consisting of a halide, a nitrate and a hydroxide;
wherein the mixing comprises a first mixing stage at a mixing speed of about 2-5 rpm to obtain flocs of water-insoluble perchlorate salt and a second mixing state at a mixing speed of about 10-50 rpm to obtain solid precipitate of water-insoluble perchlorate salt; and
separating precipitated water-insoluble perchlorate salt from the mixed aqueous solution to obtain water-insoluble perchlorate salt and perchlorate-reduced aqueous solution.

17. The process of claim 16, wherein the aqueous solution comprises at least 10 ppm of perchlorate ions.

18. The process of claim 16, wherein the concentration of perchlorate in the perchlorate-reduced aqueous solution is at least 50% less than the perchlorate concentration in the aqueous solution.

\* \* \* \* \*